(12) United States Patent  
Cooper

(10) Patent No.: US 9,378,656 B2  
(45) Date of Patent: Jun. 28, 2016

(54) ELECTRONIC EXERCISE MONITOR WITH HUMAN FACSIMILE AND AUDIBLE FEEDBACK

(71) Applicant: Meredith Cooper, Grand Ledge, MI (US)

(72) Inventor: Meredith Cooper, Grand Ledge, MI (US)

( * ) Notice: Subject to any disclaimer, the term of this patent is extended or adjusted under 35 U.S.C. 154(b) by 92 days.

(21) Appl. No.: 14/637,188

(22) Filed: Mar. 3, 2015

(65) Prior Publication Data

US 2015/0179084 A1      Jun. 25, 2015

Related U.S. Application Data

(63) Continuation-in-part of application No. 14/150,918, filed on Jan. 9, 2014, now abandoned.

(60) Provisional application No. 61/751,015, filed on Jan. 10, 2013.

(51) Int. Cl.
| | |
|---|---|
| *G09B 19/00* | (2006.01) |
| *A63B 69/20* | (2006.01) |
| *A63B 69/34* | (2006.01) |
| *A47F 8/00* | (2006.01) |

(52) U.S. Cl.
CPC ............. *G09B 19/0015* (2013.01); *A47F 8/00* (2013.01); *A63B 69/208* (2013.01); *A63B 69/34* (2013.01)

(58) Field of Classification Search
CPC .... A63B 69/208; A63B 69/34; A63B 69/004; A63B 21/0004; A63H 15/06; A63H 3/003; A63H 3/10; G09B 19/0015; A47F 8/00

USPC ........... 482/1, 8, 83, 85, 92, 93, 106, 104, 94, 482/139, 148

See application file for complete search history.

(56) References Cited

U.S. PATENT DOCUMENTS

| | | | | |
|---|---|---|---|---|
| 1,374,840 | A | * | 4/1921 | Feist ............................... 434/250 |
| 1,378,669 | A | * | 5/1921 | Feist ............................... 434/250 |
| 3,861,676 | A | * | 1/1975 | Paul .................................. 482/83 |
| D285,912 | S | * | 9/1986 | Joffee .......................... D11/160 |
| 5,778,914 | A | * | 7/1998 | Trani ................................ 135/66 |
| 6,863,587 | B1 | * | 3/2005 | Bennett .......................... 446/297 |
| 7,128,691 | B2 | * | 10/2006 | Cottrell ............................. 482/3 |
| 2002/0198090 | A1 | * | 12/2002 | McKinney .................... 482/148 |
| 2006/0089239 | A1 | * | 4/2006 | Davies ............................ 482/91 |
| 2007/0277414 | A1 | * | 12/2007 | Canon ............................. 40/612 |
| 2011/0281695 | A1 | * | 11/2011 | Machado et al. .............. 482/83 |
| 2011/0294394 | A1 | * | 12/2011 | Nelson et al. ................ 446/325 |

* cited by examiner

*Primary Examiner* — Loan H Thanh  
*Assistant Examiner* — Sundhara Ganesan  
(74) *Attorney, Agent, or Firm* — Robert W. Gray; The Gray Law Group, LTD

(57) ABSTRACT

An interactive electronic exercise software program and mobile electronic device application with audible feedback resides in a human facsimile apparatus used as a dance partner during aerobic exercises. The interactive software program creates the illusion of working out with a friend, companion or personal trainer, providing interactive visual and auditory stimulus designed to make the workout enjoyable so that the user will continue to work out on a regular basis. The interactive software program is also designed to motivate the user to exercise and to continue exercising for an optimal duration. The interactive software program monitors the user's workout and provides audible feedback to the user regarding workout practices and results, and may respond to user input, such as speech or keypad entry, or may be equipped with sensors to provide feedback on the workout itself.

19 Claims, 2 Drawing Sheets

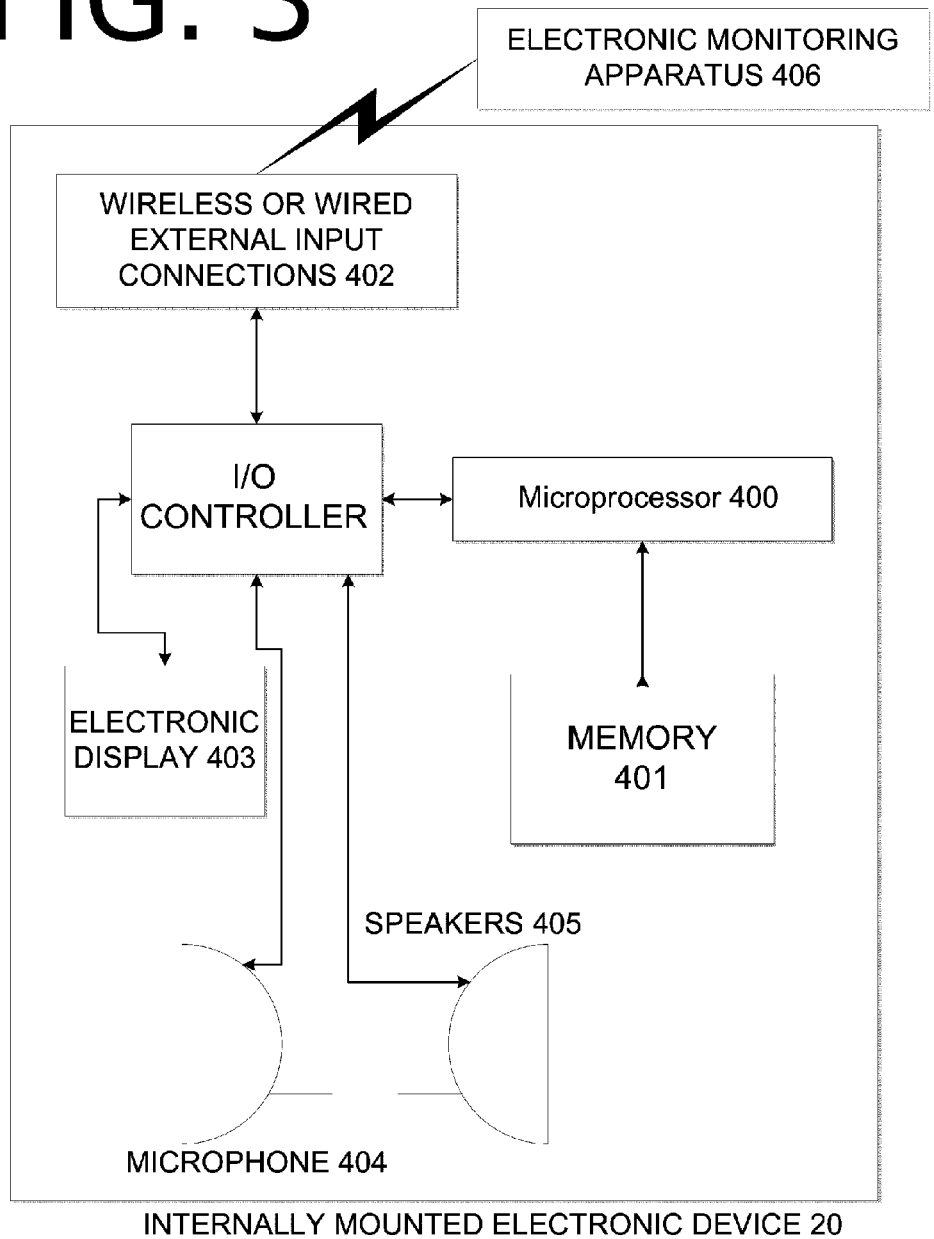

ELECTRONIC EXERCISE MONITOR WITH HUMAN FACSIMILE AND AUDIBLE FEEDBACK

CROSS-REFERENCE TO RELATED APPLICATIONS

This application is a continuation-in-part of copending U.S. patent application Ser. No. 14/150,918, filed Jan. 9, 2014, which claims the benefit of U.S. Provisional Application No. 61/751,015, filed Jan. 10, 2013, both of which are hereby incorporated by reference.

STATEMENT REGARDING FEDERALLY SPONSORED RESEARCH OR DEVELOPMENT

Not Applicable

PARTIES TO A JOINT RESEARCH AGREEMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The invention relates generally to electronic exercise monitoring software programs and mobile electronic device applications, and in particular to an interactive electronic exercise software program and mobile electronic device application with audible feedback, that resides in a human facsimile apparatus used as a dance partner during aerobic exercises. Persons who exercise often have trouble monitoring their workouts and determining progress that has been made, and whether the workout has been completed. Further, older persons, particularly persons over the age of 40, may often feel a lack of incentive to exercise due to a lack of a workout partner. The interactive software program and the human facsimile apparatus create the illusion of working out with a friend, companion or personal trainer, providing interactive visual and auditory stimulus designed to motivate the user to enjoy exercising, and to continue to exercise on a regular basis as well as to exercise for an optimal duration. The software program monitors the user's workout and provides audible feedback to the user regarding workout practices and results, and may respond to user input, such as speech or keypad entry, or may be equipped with sensors to provide feedback on the workout itself.

SUMMARY OF THE INVENTION

Accordingly, the invention is directed to an interactive electronic exercise software program and mobile electronic device application with audible feedback that resides in a human facsimile apparatus used as a dance partner during aerobic exercises. The interactive software program creates the illusion of working out with a friend, companion or personal trainer, providing interactive visual and auditory stimulus designed to make the workout enjoyable so that the user will continue to work out on a regular basis. The interactive software program is also designed to motivate the user to exercise and to continue exercising for an optimal duration. The interactive software program monitors the user's workout and provides audible feedback to the user regarding workout practices and results, and may respond to user input, such as speech or keypad entry, or may be equipped with sensors to provide feedback on the workout itself.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

BRIEF DESCRIPTION OF THE DRAWINGS

The accompanying drawings are included to provide a further understanding of the invention and are incorporated into and constitute a part of the specification. They illustrate one embodiment of the invention and, together with the description, serve to explain the principles of the invention.

FIG. 3 shows a component diagram of the internally mounted electronic device, showing the internally mounted electronic device 20, the microprocessor 400, the memory 401, the wireless or wired external input connections 402, the electronic display 403, the microphone 404, the speakers 405, and the electronic monitoring apparatus 406.

DETAILED DESCRIPTION OF THE INVENTION

Referring now to the invention in more detail, the invention is directed to an interactive electronic exercise software program and mobile electronic device application with audible feedback that resides on a human facsimile apparatus 10. The interactive software program creates the illusion of working out with a friend, companion or personal trainer, providing an interactive human facsimile apparatus 10 which will provide visual and auditory stimulus designed to motivate the user to exercise and to continue exercising for an optimal duration. The interactive software program monitors the user's workout and provides audible feedback to the user regarding workout practices and results, and may respond to user input, such as speech or keypad entry, or may be equipped with sensors to provide feedback on the workout itself.

Figure 1:
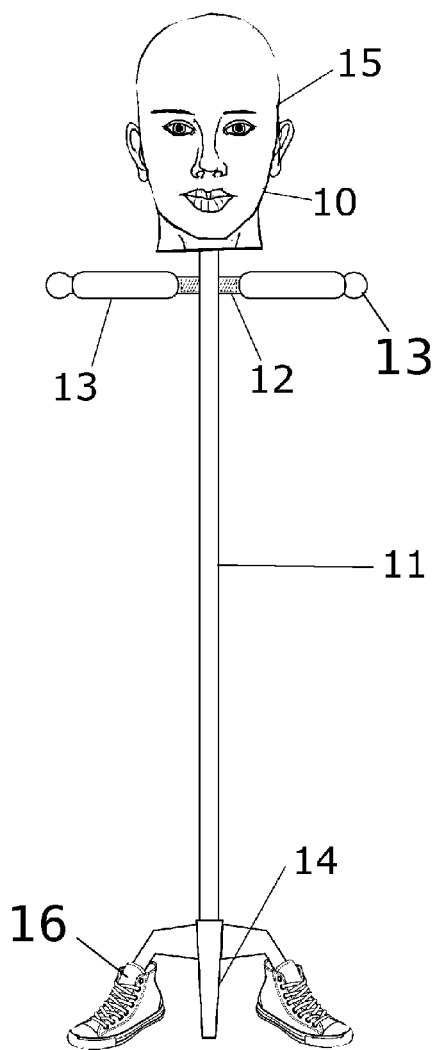
FIG. 1 shows a front view of the human facsimile apparatus 10 of the first exemplary embodiment, with the elastic band removed, showing the vertical member 11, the horizontal member 12, the handles 13, the spring 14, the head 15, and legs 16.
Figure 2:
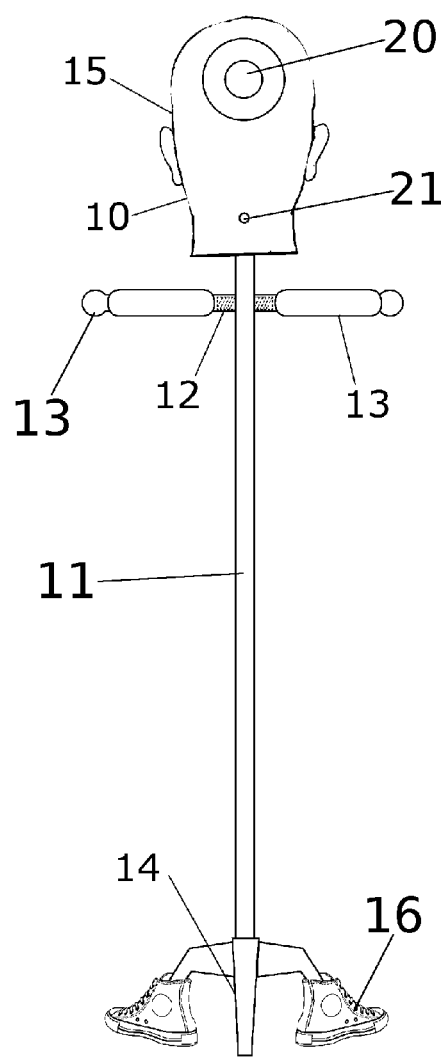
FIG. 2 shows the back view of the human facsimile apparatus 10 produced by the first exemplary embodiment, with the elastic band removed, showing the vertical member 11, the horizontal member 12, the handles 13, the spring 14, and the head 15, legs 16, internally mounted electronic device 20, and speaker/microphone position 21.

The human facsimile apparatus 10 will include a horizontal member 12, a vertical member 11, and a head 15. The vertical member 11, which is preferably a single rigid shaft of a consistent radius, as shown, will be the approximate height of a human and the horizontal member 12 will be the approximate width of human shoulders; the length of each will be adjustable by the user. The horizontal member 12 will be affixed in a cross configuration (the cross configuration lacks any component extending substantially out of its own plane) to the vertical member 11 at a comfortable gripping height for a human user, however the horizontal member 12 is preferably configured along a single straight line at right angles to the vertical member 11 without an articulated, moveable, or angled joints and without any portions of substantial length extending along a line other than the main horizontal straight line, as shown in FIGS. 1-2. Further, the cross configuration between the vertical member 11 and horizontal member is preferably configured such that the two elements are non-removably and non-rotatably affixed to one another, and affixed such that they intersect at a point substantially distant from either end of the vertical member 11 and of the horizontal member 12. Handles 13 will be attached to the horizontal member 12 using threaded studs, and will be easily removed to be used as exercise weights, and then replaced; to this end the handles are preferably two in number and of equal weight such that the entire apparatus is balanced when the weights are either both detached or both attached. A "handle" as used herein refers to a relatively small structure suitable for and configured for maintaining the grip of the human user on the apparatus of the invention, as opposed to a decorative or facsimile handle of the human analog of the apparatus, and as opposed to a handle in isolation from the thing that is to be gripped and controlled (the horizontal member 12), and as opposed to a spherical structure, and as opposed to a structure that is configured for being stricken and absorbing the shock of being stricken, as by a person training for boxing or martial arts. The handles 13 preferably create an enlarged radius of the horizontal member 12 while retaining an overall cylindrical shape, optionally contoured, and remaining essentially in-line with it. The vertical member 11 will be supported at its base by a spring 14, not affixed to the floor, a base, or any type of substrate. The spring 14 is preferably a single spring in-line with the vertical member 11, as shown. This allows the vertical member 11 to be tilted in all directions, and returned to its neutral position at vertical. Between the vertical member 11 and the handles 13, the vertical member 11 preferably lacks any structure protruding substantially from its constant radius. Facsimile legs 16, optionally with athletic shoes or facsimile athletic shoes as shown, may be affixed to the vertical member 11 near the base. The facsimile legs 16 are preferably short relative to the height of the vertical member 11 and are rigid and not articulated, as shown. The vertical member 11 may also have a removable elastic band at its base, which may be installed for such activities as leg and thigh stretches or removed for other exercises.

The head 15 would preferably contain the device's internally mounted electronic device 20, including a microprocessor 400, memory 401, a microphone 404, one or more speakers 405, and wireless or wired external input connections 402, which are in electronic communication with the monitoring attachments 406. The horizontal member 12 and the vertical member 11 would be preferably composed of PVC and the head 15 of the human facsimile apparatus 10 would preferably be composed of high-impact, molded plastic. The outward appearance of the human facsimile apparatus may have any desired characteristics, including a male or female appearance and appearance of any ethnic background or age; different versions may be provided according to user preference.

Electronic monitoring apparatus 406 for the device may be worn by the user around the waist, chest, arm, or leg to monitor cardiac and respiratory rates, muscle contractions and/or cyclical motion such as running, lifting or cycling. Such electronic monitoring apparatus are generally well-known in the prior art and are commercially available. Electronic monitoring apparatus 406 may also be placed under an exercise mat or attached to a stationary cycle, elliptical machine, barbell, weight machine or other exercise equipment. A switch, such as a contact switch or mercury switch, would be used to measure repetitions.

The software program of the present invention preferably provides audible feedback to the user in a multitude of forms, including repetitions of the cyclical movement per minute, total repetitions performed, total time elapsed, cardiac and respiratory rates, and estimates of calories burned (generically, "biometric data"), using both digital displays and recorded or synthesized verbal messages. The interactive software monitoring program also preferably provides audible messages of encouragement to motivate the user. These messages will encourage continued repetition of the exercise until the planned exercise period is completed.

The interactive software monitoring program may operate on a computer system that stands alone in devices other than the human facsimile apparatus 10, such as a mobile electronic device, a personal computer, the console of exercise equipment such as a treadmill or elliptical machine, or some other device. In this second exemplary embodiment, the interactive software monitoring program will preferably provide a visual guide to the user to demonstrate the correct body form while performing an exercise. The visual guide may be an animated trainer or exercise partner, or it may consist of live action film clips of a trainer or exercise partner. It will also preferably identify correct motions, and provide advisories to improve exercise motions when they are incorrect, as derived from workout feedback data, described below.

The interactive software monitoring system would preferably consist of the above described monitoring attachments, which respond to and measure motion associated with the exercise performed and transmit signals; a processor to receive the signals and determine the audio and digital messages to be transmitted to the user; a memory device for storage of sound data indexed with a plurality of values corresponding to the monitored exercise activity; the sound data itself, preferably comprised of data that represents the plurality of values; and a voice generator, reproducing recorded statements in an actual human voice, or a voice synthesizer creating a lifelike human voice. The content of the speech may include statements of encouragement, instructions, and feedback on the workout session. The step of presenting speech signals may be generally understood to mean accessing message content stored persistently in the computer system's memory (if, in pre-recorded form, then as encoded sound data, or if, in to-be-generated form, as textual data), if textual data is provided, converting the textual data to audio data through a (well-known and commercially available) text-to-speech engine, converting the encoded sound data into an analogous electronic signal using a (well-known and commercially available) digital-analog decoder, and transmitting the analogous electronic signal to one or more speakers 405 which convert the audio data into audible sound.

The step of presenting speech content comprising encouragement is achieved by, upon a contextual signal, for example a change in the user's measured or detected workout activities (according to the step for deriving workout feedback data, below), selecting from stored content, content that is a statement of encouragement, and presenting the content according to the step of presenting speech above. The step of presenting speech content comprising workout instructions similarly is achieved by, upon a contextual signal, for example the user selecting a particular workout from a list or menu of predetermined workout programs, selecting from stored content, content that is instructions for performing the selected workout, and presenting the content according to the step of presenting speech above.

The step of accepting voice command input from a human user is achieved by monitoring or listening to a signal generated by the microphone 404, converting the signal to digital form via a (well-known and commercially available) analog-digital encoder, inputting the resulting encoded speech through a (well-known and commercially available) speech recognition engine, and concluding whether the speech content represents any of a set of predetermined commands, and then performing a software function associated with the particular predetermined command that was spoken.

The step of deriving workout feedback data from the electronic monitoring apparatus 406 is achieved by monitoring digital or analog signals on one or more of the wireless or wired input connections 402. If such signals are in digital form, they may be used directly; if in analog form, they may be converted using a (well-known and commercially available) analog-digital encoder. The resultant data may either be presented directly, for example the user's measured heart rate, or may be combined with other data, such as the elapsed time and/or data series over time to calculate the calories consumed or other calculated value that is of interest. The measured or calculated data may be generically understood as workout feedback data", which may be presented by either choosing appropriate pre-generated encoded sound data or generating encoded sound data according to the step above for presenting speech.

Where an electronic display 403 is provided, whether in the context of the human facsimile or not, the step of displaying a visual guide is achieved by accessing a digital representation of the visual guide content that is stored persistently in the memory 401, and transmitting the digital representation of the visual guide to the electronic display 403 which converts the digital representation into a visible image.

Components listed are preferable; however, artisans will recognize that alternative components could be selected without altering the scope of the invention.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention

I claim:

1. A human facsimile workout apparatus comprising:
   (a) a vertical member;
   (b) a horizontal member;
   (c) said vertical member being the approximate height of a human user;
   (c) said horizontal member being rigidly affixed to said vertical member in a cross configuration;
   (d) said horizontal member being rigidly affixed to said vertical member at approximately shoulder height for said human user;
   (e) said horizontal member being of a length approximately equal to the shoulder width of said human user;
   (f) said horizontal member terminating at its distal ends in a pair of handles;
   (g) said pair of handles being removably affixed to said horizontal member at its distal ends;
   (h) a facsimile human head;
   (i) said facsimile human head being affixed to said vertical member at its top end;
   (j) a spring;
   (k) said spring being affixed to said vertical member at its lower end;
   (l) a pair of legs;
   (m) said legs being affixed to said vertical member near its lower end;
   (n) wherein said horizontal member lacks articulated, moveable, or angled joints.

2. The human facsimile apparatus of claim 1 wherein said pair of handles are of increased mass whereby said human user may perform hand weighted exercises while holding said pair of handles when said pair of handles are removed from said horizontal member.

3. The human facsimile apparatus of claim 1 wherein said horizontal member and said vertical member are non-removably and non-rotatably affixed to one another.

4. The human facsimile apparatus of claim 1 wherein said horizontal member and said vertical member are affixed to one another such that said horizontal member and said vertical member intersect at a point substantially distant from either end of said vertical member or of said horizontal member.

5. The human facsimile apparatus of claim 1 wherein said spring is a single spring positioned in-line with said vertical member.

6. The human facsimile apparatus of claim 1 wherein said spring is not affixed to the floor, a base, or any type of substrate.

7. The human facsimile apparatus of claim 1 wherein said vertical member is a single rigid shaft of a consistent radius.

8. The human facsimile apparatus of claim 1 wherein said vertical member, between said spring and said pair of handles, lacks any structure protruding substantially from its radius.

9. The human facsimile apparatus of claim 1 wherein said cross configuration lacks any component that extends substantially out of its own plane.

10. The human facsimile apparatus of claim 1 wherein said pair of handles is positioned in-line with said horizontal member.

11. The human facsimile apparatus of claim 1 wherein said pair of handles form an enlarged radius of said horizontal member, and said pair of handles retain an overall cylindrical shape.

12. The human facsimile apparatus of claim 1 wherein each of said pair of handles is not:
   (a) a decorative or facsimile structure;
   (b) configured for gripping and controlling any object other than said horizontal member;
   (c) spherical in shape; or
   (d) configured for absorbing the shock of being stricken.

13. The human facsimile apparatus of claim 2 wherein said pair of handles is positioned in-line with said horizontal member.

14. The human facsimile apparatus of claim 2 wherein said pair of handles form an enlarged radius of said horizontal member, and said pair of handles retain an overall cylindrical shape.

15. The human facsimile apparatus of claim 2 wherein each of said pair of handles is not:
   (a) a decorative or facsimile structure;
   (b) configured for gripping and controlling any object other than said horizontal member;
   (c) spherical in shape; or
   (d) configured for absorbing the shock of being stricken.

16. The human facsimile apparatus of claim 1 wherein said horizontal member and said vertical member are non-removably and non-rotatably affixed to one another.

17. The human facsimile apparatus of claim 1 wherein said horizontal member and said vertical member are affixed to one another such that said horizontal member and said vertical member intersect at a point substantially distant from either end of said vertical member or of said horizontal member.

18. The human facsimile apparatus of claim 16 wherein said horizontal member and said vertical member are affixed to one another such that said horizontal member and said vertical member intersect at a point substantially distant from either end of said vertical member or of said horizontal member.

19. The human facsimile apparatus of claim 7 wherein said vertical member, between said spring and said pair of handles, lacks any structure protruding substantially from its radius.

\* \* \* \* \*